United States Patent Office 3,328,170
Patented June 27, 1967

3,328,170
FEEDSTUFF FOR SILKWORMS CONTAINING AROMATIC POLYHYDROXY - CARBOXYLIC ACID AND METHOD
Yasuji Hamamura, 1–14, Shibabashi-cho, Omuro, Ukyo-ku, Kyoto, Japan, and Keizo Hayashiya, Kita-ku, Kyoto, and Kenichi Naito, Ukyo-ku, Kyoto, Japan; said Hayashiya and said Naito assignors to said Hamamura
No Drawing. Continuation of application Ser. No. 348,770, Mar. 2, 1964. This application Mar. 10, 1966, Ser. No. 533,389
Claims priority, application Japan, Mar. 6, 1963, 38/11,944
14 Claims. (Cl. 99—2)

This application is a continuation of Ser. No. 348,770, filed Mar. 2, 1964 which is now abandoned.

This invention relates to feedstuff for silkworms, more particularly it relates to feedstuff for silkworms which contains polyhydroxy-carboxylic acid such as chlorogenic acid, caffeic acid, gallic acid, gentisic acid, homogentisic acid, resorcylic acid, quinic acid and uronic acid.

While silkworms are known to be monophargous in eating nothing but mulberry leaves, no exact reason for it has been made clear. The present inventors found that in mulberry leaves there are contained such factors as the attracting factor which attracts silkworms (terpenes such as citral, linalyl acetate, linalol, terpinyl acetate), the biting factor which stimulates silkworms to bite ($\beta$-sitosterol with or without flavonoids such as quercetin, morin, rutin, isoquercitrin), the swallowing factor which stimulates silkworms to bite and swallow continuously (cellulose powder), and sugar such as sucrose, fructose, glucose and inorganic phosphate such as potassium dihydrogen phosphate, dipotassium hydrogen phosphate, sodium dihydrogen phosphate, disodium hydrogen phosphate, calcium phosphate, and these are indispensable for the feed of silkworms. Conditions of the feedstuff, e.g. taste, nutritional value, are inferred to be of merely secondary significance in a strict sense for inducing silkworms to the action of eating, though they should certainly be considered in connection with the insectal growth.

Further, Dr. Hamamura, one of the present inventors found that choline or its derivatives such as choline chloride, acetylcholine chloride, choline phosphochloride, lecithin and benzoylcholine chloride have a distinguishable action on metamorphosis of silkworms, and such substances have been named as the growth-promoting factor.

The present inventors have extensively studied on the feeding of silkworms so as to rear silkworms with an artificial diet without any addition of mulberry leaves and found that polyhydroxy-carboxylic acids such as chlorogenic acid, caffeic acid, gallic acid, gentisic acid, homogentisic acid, resorcylic acid, quinic acid and uronic acid, have a remarkable effect on promoting the urge for silkworms to eat. That is, when feedstuff containing polyhydroxy-carboxylic acid is given to silkworms, an amount of feedstuff eaten by silkworms is effectively increased. Accordingly, the present inventors have named such substance as the feed-intake promoting factor.

The object of this invention is to promote the urge for silkworms to eat feed. The object is realized by giving silkworms feedstuff containing polyhydroxy-carboxylic acid.

Polyhydroxy-carboxylic acids may be used irrespective of their being in free state, as salts thereof, e.g. sodium salt, potassium salt, or as esters thereof e.g. methyl ester, ethyl ester. Further, as the polyhydroxy-carboxylic acids, those produced synthetically or those obtained from natural sources may similarly be employed, so long as a substance which silkworms do not like to eat is not present.

As polyhydroxy-carboxylic acid, there may be used chlorogenic acid, caffeic acid, gallic acid, gentisic acid, homogentisic acid, resorcylic acid, quinic acid, uronic acid, etc. Especially, employment of chlorogenic acid and/or caffeic acid gives a preferable result in general. From mulberry leaves, chlorogenic acid can be extracted in such a manner as follows:

5.2 kilograms of mulberry leaves were steamed for 1 minute and extracted with methanol. After concentration of the extracted fluid, ether was added. To the water layer active charcoal was added and kept standing for a night. Then the substance adsorbed on active charcoal was extracted with 1% ammoniacal methanol and the methanol solution was concentrated in vacuum, followed by adding ethyl acetate and shaking. To the water layer lead acetate was added to obtain precipitate. The precipitate was suspended in water. To the suspension hydrogen sulfide was introduced to precipitate lead sulfide which was then removed by filtration. After being acidified, the filtrate was extracted with ethyl acetate, followed by concentrating the solvent layer to dryness. The residue was dissolved in ethyl acetate, to which was added chloroform to yield precipitate. The precipitate was dissolved in water and then chloroform was added again. Water layer was separated and extracted with ethyl acetate, followed by concentration of the water layer to dryness. The residue was recrystallized from water to obtain white crystalline chlorogenic acid melting at 205° C. Yield: 0.38 gram.

Chlorogenic acid may be extracted from many plants other than mulberry leaves, e.g. tobacco plant leaves, pear leaves, tea plant leaves, apple sarcocarp, in the same way as mentioned above. Further, chlorogenic acid produced by microorganisms, e.g. *Piricularia oryzae* Cavara, *Ceratostomella fimbriata* Ellis may similarly be employed in this invention.

As uronic acid, there may, for example, be gulonic acid, manuronic acid and galacturonic acid.

In most cases, feed-intake of silkworms may be greatly promoted by employing flavonoid such as morin together with polyhydroxy-carboxylic acid.

For the practical feeding, an addition of other factors which are necessary for inducing silkworms to eat and promoting the growth of silkworms must be taken into consideration. In most cases, for a practical application the feedstuff of this invention may be utilized together with the afore-mentioned factor, biting factor, swallowing factor and the growth promoting factor, i.e. terpenes, $\beta$-sitosterol with or without flavonoid, cellulose powder, and choline, especially its chloride, though terpenes may be omitted when silkworms are put on the feed, and sugar, inorganic phosphate, inorganic silicate, inositol, etc. by mixing various components necessary for the growth of silkworms. As the components which are necessary for the growth of silkworms, there may, fo rexample, be agar-agar, sodium carboxymethyl cellulose, methylcellulose, aginic acid; soybean powder, parched bean flour, defatted soybean powder, bean curd, dried fermented soybean powder, defatted and dried bean paste; cereal flour such as rice flour, barley flour, wheat flour, or their processed matter; yeast or its processed matter such as dry yeast, yeast extract, extracted fluid of yeast, cake of extracted yeast; straw ashes, and fish meal. They also serve the role of a carrier. Further there may be the following nutritious components:

Animal or plant proteins;

Amino acids such as glutamic acid, aspartic acid, leucine, lysine, tryptophane, valine, serine, proline, glucine, alanine, isoleucine, phenylalanine, arginine, methionine, threonine, or their salts;

Vitamins such as pantothenic acid, nicotinic acid, vitamin $B_1$, vitamin $B_2$, vitamin $B_6$, vitamin $B_{12}$, vitamin C, vitamin D, biotin, folic acid, vitamin K, vitamin E, vitamin P, inositol, orotic acid, α-lipoic acid;

Inorganic salts such as calcium carbonate, sodium carbonate, sodium hydrogencarbonate, sodium chloride;

Honey collected from beehive or its processed matter;

Pectin;

Enzymes such as diastase, papain, trypsin;

Preservatives such as sodium dehydroacetate, vitamin $K_3$, sodium sorbate;

Antibiotics such as tetracycline, chlortetracycline, oxytetracycline, streptomycin, dihydrostreptomycin, neomycin, kanamycin, picromycin, leucomycin, erythromycin, oleandomycin, trichomycin, chloramphenicol, penicillin;

Sulfa drugs such as sulfaisomidine, sulfaisoxazole;

Furan derivatives such as nitrofuran; and

Glucuronic acid or its salt such as sodium salt, potassium salt, calcium salt, ammonium salt, organic amine salt, glucuronic acid ethyl ester, glucuronic acid amide, 2-amino-2-desoxy-D-glucuronic acid or its salt, N-glucuronoside-glucosamine or its salt.

When desired, the feedstuff of this invention may be added solely or in combination with the above-mentioned components, to the additive for the silkworms, or to the agent for preventing and curing silkworms' diseases.

The quantities of the feedstuff of this invention to be added to the artificial diet may be varied depending on various conditions such as instar or the state of the silkworms and the kind of quantity of the other components composing the artificial diet. Generally, it may be preferable to employ 0.1–10 milligrams of feedstuff of this invention per 1 gram of the dried artificial diet.

The feedstuff of this invention may be used in powdery form or in jelly or paste form.

The following experiments are given to show the efficacy of the feedstuff of this invention.

EXPERIMENT I 10 larvae or silkworms are reared with the basal artificial diet I and artificial diets II, III, IV, V, VI, VII and VIII, and the total number of feces for 2 days is counted.

*Basal artificial diet.*—Diet which is prepared by mixing 1 gram of cellulose powder, 5 milligrams of inositol, 10 milligrams of inorganic phosphate and 5 milligrams of β-sitosterol with 3 cubic centimeters of water containing 2% of agar-agar and 3% of sugar.

*Artificial diet II.*—Diet whose components are corresponding to those of the basal artificial die I except that 0.3 gram of cellulose powder is replaced with the same weight of mulberry leaves powder.

*Artificial diet III.*—Basal artificial diet I plus 0.3 milligram of chlorogenic acid.

*Artificial diet IV.*—Basal artificial diet I plus 2.5 milligrams of morin plus 0.3 milligram of chlorogenic acid.

*Artificial diet V.*—Basal artificial diet I plus 2.5 milligrams of morin plus 0.3 milligram of caffeic acid.

*Artificial diet VI.*—Basal artificial diet I plus 2.5 milligrams of isoquercitrin.

*Artificial diet VII.*—Basal artificial diet I plus 2.5 milligrams of isoquercitrin plus 0.3 milligram of chlorogenic acid.

*Artificial diet VIII.*—Basal artificial diet I plus 2.5 milligrams of isoquercitrin plus 0.3 milligram of caffeic acid.

RESULT

| Diet | Number of silkworms employed for the test | Number of feces |
|---|---|---|
| I | 10 | 139 |
| II | 10 | 545 |
| III* | 10 | 206 |
| IV | 10 | 530 |
| V | 10 | 461 |
| VI | 10 | 158 |
| VII | 10 | 409 |
| VIII | 10 | 379 |

EXPERIMENT II

Larvae of silkworms are reared with the basal artificial diet IX and X. The time required for silkworms to reach the 2nd instar, the number of silkworms which survive up to the 2nd instar and the weight of silkworms of the 2nd instar are observed.

BASAL ARTIFICIAL DIET IX

| | | |
|---|---|---|
| Cellulose powder | grams | 5.0 |
| Defatted soybean powder | do | 2.0 |
| Starch | do | 1.5 |
| Sugar | do | 1.0 |
| Wesson's minerals | do | 0.100 |
| NaCl | milligrams | 10.50 |
| KCl | do | 12.00 |
| $KH_2PO_4$ | do | 31.00 |
| $Ca_3(PO_4)_2$ | do | 14.90 |
| $CaCO_3$ | do | 21.00 |
| $MgSO_4$ | do | 9.00 |
| $FePO_4 \cdot 4H_2O$ | do | 1.47 |
| $MnSO_4$ | do | 0.020 |
| $K_2Al_2(SO_4)_4 \cdot 24 H_2O$ | do | 0.009 |
| $CuSO_4 \cdot 5 H_2O$ | do | 0.039 |
| NaF | do | 0.057 |
| KI | do | 0.005 |
| Vitamins: | | |
| Vitamin C | gram | 0.04 |
| Vitamin $B_1$ | milligram | 0.01 |
| Vitamin $B_2$ | do | 0.01 |
| Vitamin $B_6$ | do | 0.01 |
| Nicotinic acid | do | 0.02 |
| Calcium pantothenate | do | 0.02 |
| Folic acid | do | 0.002 |
| Biotin | do | 0.002 |
| Vitamin $B_t$ | do | 0.01 |
| β-Sitosterol | do | 50 |
| Morin | do | 25 |
| Inositol | do | 50 |
| $K_2HPO_4$ | do | 50 |
| $SiO_2$ | do | 250 |
| Water | cubic centimeters | 15 |

*Artificial diet X.*—Basal artificial diet IX plus 5 milligrams of chlorogenic acid plus 5 milligrams of acetylcholine chloride plus 10 milligrams of dihydrostreptomycin.

RESULT

| Diet | Number of silkworms employed for the test | Time required for silkworms to reach the 2nd instar | Number of silkworms which survive up to the 2nd instar | Weight of silkworms of the 2nd instar (milligram) |
|---|---|---|---|---|
| IX | 20 | 7 | 8 | 5.7 |
| X | 20 | 7 | 17 | 5.8 |

EXPERIMENT III

Experiment is carried out in the same way as in Experiment I.

RESULT

Diet: Number of feces
- Basal artificial diet I _____ 60
- Basal artificial diet I plus 0.3 milligram of chlorogenic acid _____ 238
- Basal artificial diet I plus 1 milligram of chlorogenic acid _____ 267
- Basal artificial diet I plus 3 milligrams of chlorogenic acid _____ 125

The present invention will now be described in further particular by means of the following examples. It will be, of course, understood that the invention is not limited to the particular details of these examples since they only set forth preferred exemplary embodiments of the invention. In these examples, percent is weight percent.

Example 1

Feedstuff for silkworms is prepared by mixing 1 gram of cellulose powder, 5 milligrams of inositol, 10 milligrams of inorganic phosphate, 0.3 milligram of chlorogenic acid and 5 milligrams of β-sitosterol with 3 cubic centimeters of water containing 2% of agar-agar and 3% of sugar.

Example 2

Feedstuff for silkworms consists of 5 grams of cellulose powder, 2.0 grams of defatted soybean powder, 1.5 grams of starch, 1.0 gram of sugar, 0.090 gram of Wesson's minerals, 0.04 gram of vitamin C, 0.01 milligram of vitamin $B_1$, 0.01 milligram of vitamin $B_2$, 0.01 milligram of vitamin $B_6$, 0.02 milligram of nicotinic acid, 0.02 milligram of calcium pentathenate, 0.002 milligram of folic acid, 0.002 milligram of biotin, 0.01 milligram of vitamin $B_t$, 50 milligrams of β-sitosterol, 25 milligrams of morin, 50 milligrams of inositol, 50 milligrams of $K_2HPO_4$, 250 milligrams of $SiO_2$, 10 milligrams of chlorogenic acid and 15 cubic centimeters of water.

What is claimed is:

1. Feedstuff for silkworms containing attracting factor, biting factor, swallowing factor and aromatic polyhydroxycarboxylic acid as a silk-worm feed-intake promoting factor.

2. Feedstuff for silkworms containing attracting factor, biting factor, swallowing factor and as feed intake promoting factor a member selected from the group consisting of chlorogenic acid, caffeic acid, gallic acid, gentisic acid, homogentisic acid, resorcylic acid, quinic acid, and a mixture of more than one of them.

3. Feedstuff according to claim 2 and further containing flavonoid.

4. Feedstuff according to claim 2, and further containing β-sitosterol as a biting factor, cellulose powder as a swallowing factor, a sugar, an inorganic phosphate and a terpene as an attracting factor.

5. Feedstuff according to claim 4 and further containing a flavonoid and inositol.

6. Feedstuff according to claim 5 and further containing a choline.

7. Feedstuff for silkworms claimed in claim 1, wherein the amount of aromatic polyhydroxy-carboxylic acid is approximately 0.01–1% by weight relative to the total weight of the dried artificial feed to which the feedstuff is added.

8. Feedstuffs for silkworms claimed in claim 2, wherein the amount of the member selected from the group consisting of chlorogenic acid, caffeic acid, gallic acid, gentisic acid, homogentisic acid, resorcylic acid, quinic acid, and a mixture of more than one of them is approximately 0.01–1% by weight relative to the total weight of the dried artificial feed to which the feedstuff is added.

9. Feedstuff for silkworms claimed in claim 3, wherein the amount of the member selected from the group consisting of chlorogenic acid, caffeic acid, gallic acid, gentisic acid, homogentisic acid, resorcyclic acid, quinic acid, and a mixture of more than one of them is approximately 0.01–1% by weight relative to the total weight of the dried artificial feed to which the feedstuff is added.

10. Feedstuff for silkworms claimed in claim 4, wherein in the amount of the member selected from the group consisting of chlorogenic acid, caffeic acid, gallic acid, gentisic acid, homogentisic acid, resorcylic acid, quinic acid and a mixture of more than one of them is approximately 0.01–1% by weight relative to the total weight of the dried artificial feed to which the feedstuff is added.

11. Feedstuff for silkworms claimed in claim 5, wherein in the amount of the member selected from the group consisting of chlorogenic acid, caffeic acid, gallic acid, gentisic acid, homogentisic acid, resorcylic acid, quinic acid, and a mixture of more than one of them is approximately 0.01–1% by weight relative to the total weight of the dried artificial feed to which the feedstuff is added.

12. Feedstuff for silkworms claimed in claim 6, wherein the amount of the member selected from the group consisting of chlorogenic acid, caffeic acid, gallic acid, gentisic acid, homogentisic acid, resorcyclic acid, quinic acid and a mixture of more than one of them is approximately 0.01–1% by weight relative to the total weight of the dried artificial feed to which the feedstuff is added.

13. The method of promoting the intake by silkworms of artificial feedstuff for silkworms which contains an attracting factor, a biting factor and a swallowing factor which comprises incorporating into the said feedstuff a feed-intake promoting factor consisting of aromatic polyhydroxy-carboxylic acid.

14. The method according to claim 13 wherein said feed-intake promoting factor is a member selected from the group consisting of chlorogenic acid, caffeic acid, gallic acid, gentisic acid, homogentisic acid, resorcyclic acid, quinic acid, and a mixture of more than one of them.

References Cited

UNITED STATES PATENTS

| | | | |
|---|---|---|---|
| 2,394,456 | 2/1946 | Korngr et al. | 99—2 |
| 2,808,416 | 10/1957 | Bell et al. | 99—8 X |
| 3,051,572 | 8/1962 | Tribble | 99—2 |
| 3,230,930 | 1/1966 | Hamamura et al. | 99—2 X |

OTHER REFERENCES

Fukuda et al., Nature, pp. 53, 54, Oct. 6, 1962.
Fukuda, Kagaku no ryoili, vol. 16, No. 11, pp. 834–840 (November 1962), pp. 1–8 of translation relied on.
Hamamura et al., Nature, pp. 754–5, May 26, 1962.
Ito, Nature, pp. 951–2, Dec. 9, 1961.

A. LOUIS MONACELL, *Primary Examiner.*

D. DONOVAN, *Assistant Examiner.*

UNITED STATES PATENT OFFICE
CERTIFICATE OF CORRECTION

Patent No. 3,328,170                      June 27, 1967

Yasuji Hamamura et al.

It is hereby certified that error appears in the above numbered patent requiring correction and that the said Letters Patent should read as corrected below.

In the heading to the printed specification, line 8, for "assignors to said Hamamura" read -- assignors, by direct and mesne assignments, of one-half to said Hamamura and one-half to Takeda Chemical Industries, Ltd., Dochomachi, Higashi-ku, Osaka, Japan --.

Signed and sealed this 17th day of December 1968.

(SEAL)
Attest:

Edward M. Fletcher, Jr.
Attesting Officer

EDWARD J. BRENNER
Commissioner of Patents